(12) United States Patent
Ravi et al.

(10) Patent No.: US 8,838,647 B2
(45) Date of Patent: Sep. 16, 2014

(54) AUTOMATIC MULTI-USER PROFILE MANAGEMENT FOR MEDIA CONTENT SELECTION

(75) Inventors: Kumar Ravi, Cedar Park, TX (US); Radhakrishnan Sethuraman, Austin, TX (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 13/312,630

(22) Filed: Dec. 6, 2011

(65) Prior Publication Data
US 2013/0144915 A1 Jun. 6, 2013

(51) Int. Cl.
*G06F 17/30* (2006.01)

(52) U.S. Cl.
USPC ............................ 707/785; 707/784; 707/913

(58) Field of Classification Search
CPC .................... G06F 17/30017; G06F 17/30035; G06F 17/30047; G06F 17/30702; G06F 17/30867; G06F 17/30657; G06F 17/30029
USPC .......................................... 707/784, 785, 913
See application file for complete search history.

(56) References Cited

U.S. PATENT DOCUMENTS

| | | | |
|---|---|---|---|
| 7,930,762 B1 | 4/2011 | Blair et al. | |
| 8,396,264 B2 * | 3/2013 | Moriyama et al. | 382/118 |
| 2006/0184800 A1 * | 8/2006 | Rosenberg | 713/186 |
| 2006/0263041 A1 | 11/2006 | Gustta | |
| 2007/0140532 A1 * | 6/2007 | Goffin | 382/118 |
| 2008/0069409 A1 * | 3/2008 | Kojima et al. | 382/115 |
| 2009/0133051 A1 * | 5/2009 | Hildreth | 725/28 |
| 2009/0138805 A1 * | 5/2009 | Hildreth | 715/745 |
| 2010/0122174 A1 * | 5/2010 | Snibbe et al. | 715/733 |
| 2010/0306670 A1 * | 12/2010 | Quinn et al. | 715/753 |
| 2011/0008019 A1 | 1/2011 | Hirano | |
| 2011/0093820 A1 * | 4/2011 | Zhang et al. | 715/863 |
| 2011/0166940 A1 * | 7/2011 | Bangera et al. | 705/14.66 |
| 2011/0257985 A1 * | 10/2011 | Goldstein | 705/1.1 |
| 2012/0030006 A1 * | 2/2012 | Yoder et al. | 705/14.41 |

(Continued)

FOREIGN PATENT DOCUMENTS

| | | |
|---|---|---|
| CN | 101951480 A | 1/2011 |
| JP | 02007312048 A | 11/2007 |
| JP | 02008009694 A | 1/2008 |

OTHER PUBLICATIONS

Kwang, Ho An, et al, "Cognitive face analysis system for future interactive TV," 2009.

*Primary Examiner* — Thanh-Ha Dang
(74) *Attorney, Agent, or Firm* — Kunzler Law Group; Steven L. Bennett (57) ABSTRACT

A profile management apparatus for controlling available media content includes an individual identifier module, a profile creation module, a profile selection module, and a media control module. The individual identifier module automatically identifies one or more individuals as currently within a perceiving range of an output device receiving input from a media player without user input. The profile creation module automatically creates a new profile without user input in response to determining that a profile associated with the one or more individuals does not exist. The profile selection module selects at least one profile associated with the one or more individuals. The media control module controls media that is available for selection on the media player based one or more of media usage information and content restriction rules of the at least one profile.

20 Claims, 6 Drawing Sheets

(56) References Cited

U.S. PATENT DOCUMENTS

2012/0140069 A1* 6/2012 Ding et al. .................... 348/143
2012/0167129 A1* 6/2012 Liou et al. ...................... 725/27
2012/0214584 A1* 8/2012 Paquet ............................ 463/30
2012/0321144 A1* 12/2012 Choong et al. ................ 382/118
2013/0080222 A1* 3/2013 Quinn .......................... 705/14.5
2013/0290233 A1* 10/2013 Ferren et al. .................... 706/46

* cited by examiner

| Individual ID | Face Data | Height Data | Behavior Data | Bluetooth Key |
|---|---|---|---|---|
| 12 | | | | |
| 34 | | | | |
| 56 | | | | |
| 78 | | | | |

| Profile ID | Individaul IDs | Media Usage | Content Restriction |
|---|---|---|---|
| ab | 12 | | |
| cd | 12, 34 | | |
| ef | 34 | | |
| gh | 34, 56, 78 | | |

AUTOMATIC MULTI-USER PROFILE MANAGEMENT FOR MEDIA CONTENT SELECTION

BACKGROUND

1. Field

The subject matter disclosed herein relates to media systems and more particularly relates to managing profiles for media consumption.

2. Description of the Related Art

Media systems are often used to provide media content of various types. For example, media systems, such as home entertainment systems, may include a display screen, audio equipment, and various types of media players that provide media content. Media content may be provided through media players such as set top boxes, DVD players, VCRs, DVRs, and/or cable or internet connections.

With the large amount of content that is available individuals often find it difficult to find content in which they are interested. For example, long lists of TV channels can be very confusing and frustrating to navigate. An individual may find that it takes some time to locate a desired channel in a long list of available channels. Even when accessing content stored on a digital video recorder (DVR) or other system an individual may find that much of the content is of interest to another household member but not themselves.

BRIEF SUMMARY

A method of the present invention is presented. In one embodiment, the method includes automatically identifying one or more individuals that are currently within a perceiving range of an output device receiving input from a media player. The media player, in certain embodiments, is for playing media content in one or more of an audio and a visual format. In one embodiment, the one or more individuals are automatically identified without user input. In another embodiment, the perceiving range includes an area where content played by the media player is perceivable to the one or more individuals.

The method, in a further embodiment, includes automatically creating a new profile. In certain embodiments, the new profile is created in response to determining that a current profile associated with the one or more individuals does not exist. In one embodiment, the new profile is automatically created without user input.

In another embodiment, the method includes selecting at least one profile associated with the one or more individuals. In one embodiment, the at least one profile includes one or more of media usage information and content restriction rules for controlling available media selection. The method, in certain embodiments, includes controlling media that is available for selection on the media player. In one embodiment, controlling of the media is based on one or more of the media usage information and the content restriction rules of the at least one identified profile.

An apparatus is provided with a plurality of modules configured to functionally execute the steps described above with regard to the presented method. In one embodiment, these modules include an individual identifier module, a profile creation module, a profile selection module, and a media control module.

In one embodiment, the individual identifier module automatically identifies one or more individuals as currently within a perceiving range of an output device receiving input from a media player. In certain embodiments, the media player is for playing media content in one or more of an audio and a visual format. In a further embodiment, the one or more individuals are automatically identified without user input. The perceiving range, in one embodiment, includes an area where content played by the media player is perceivable to the one or more individuals.

In another embodiment, the profile creation module automatically creates a new profile in response to determining that a profile associated with the one or more individuals does not exist. In a further embodiment, the new profile is automatically created without user input. In yet another embodiment, a profile selection module selects at least one profile associated with the one or more individuals. In one embodiment, the at least one profile includes one or more of media usage information and content restriction rules for controlling available media selection. The media control module, in certain embodiments, controls media that is available for selection on the media player based one or more of the media usage information and the content restriction rules of the at least one profile identified by the profile selection module.

A system of the present invention is also presented. The system may be embodied by media player and one or more modules. In one embodiment, these modules include an individual identifier module, a profile creation module, a profile selection module, and a media control module.

In one embodiment, the individual identifier module automatically identifies one or more individuals as currently within a perceiving range of an output device receiving input from a media player. In certain embodiments, the media player is for playing media content in one or more of an audio and a visual format. In a further embodiment, the one or more individuals are automatically identified without user input. The perceiving range, in one embodiment, includes an area where content played by the media player is perceivable to the one or more individuals.

In another embodiment, the profile creation module automatically creates a new profile in response to determining that a profile associated with the one or more individuals does not exist. In a further embodiment, the new profile is automatically created without user input. In yet another embodiment, a profile selection module selects at least one profile associated with the one or more individuals. In one embodiment, the at least one profile includes one or more of media usage information and content restriction rules for controlling available media selection. The media control module, in certain embodiments, controls media that is available for selection on the media player based one or more of the media usage information and the content restriction rules of the at least one profile identified by the profile selection module.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1A:
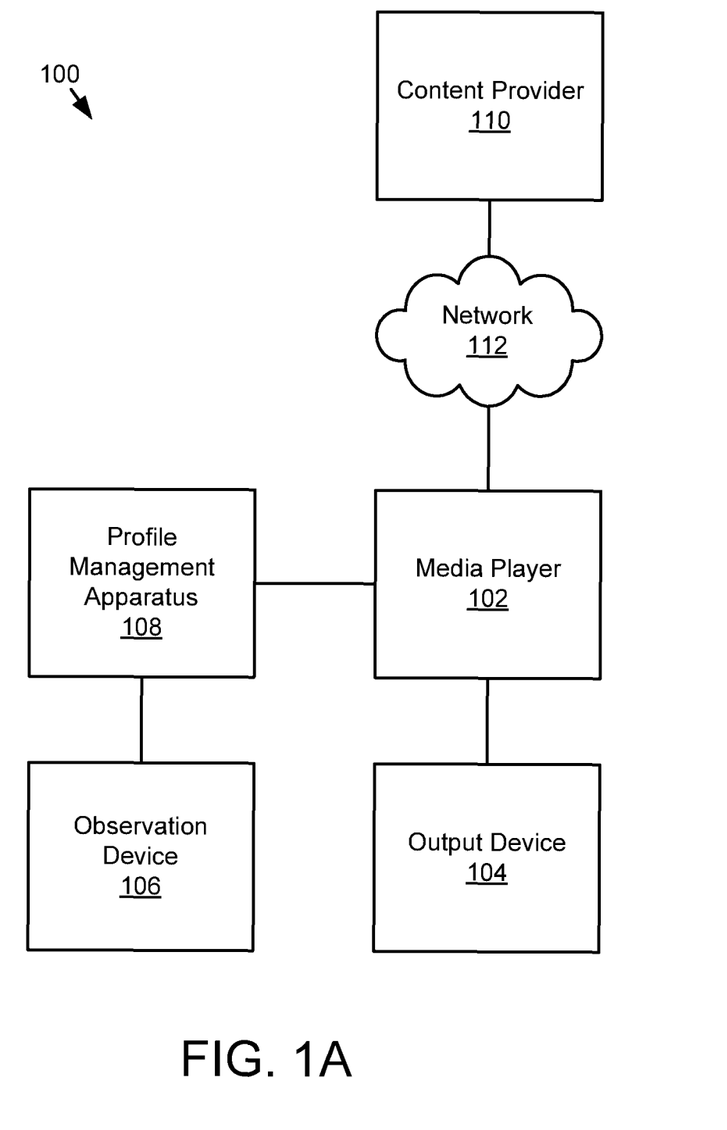
FIG. 1 is a schematic block diagram illustrating one embodiment of a media system in accordance with the present invention.

FIG. 1A is a schematic block diagram of one embodiment of a media system 100. The media system 100 may provide media content to one or more individuals. In one embodiment, the media system 100 may adjust available media content based on the one or more individuals that are perceiving the media content. The media system 100 may be used to provide media content such as TV content, movies, and/or music on one or more speakers or display screens. The media system 100 may include a media player 102, an output device 104, an observation device 106, a profile management apparatus 108, a content provider 110, and a network 112, which are described below.

The media player 102 may include hardware, firmware, and/or software for playing media content. The media player 102 may be able to play one or more types of media content such as video, audio, and/or other media content. For example, the media player 102 may be configured to decode and/or play content encoded in one or more formats. In one embodiment, the media player 102 may be able to play media content that is stored in a storage media or streamed over a communication link. For example, a media player 102 may include a device that plays content stored on one or more of a compact disc (CD), a digital video disc (DVD), a VHS cassette, a tape drive, a hard disk drive, and/or a solid state drive. The media player 102 may be able to play content from a content provider 110 that is streamed over a network 112. The network 112 may be any type of communications network such as the Internet or a television network. For example, the media player 102 may be able to receive and/or decode content streamed over a cable, fiber optic, DSL, wireless, or other communications medium.

Exemplary media players 102 may include, but are not limited to, a cable TV set-top box, a digital video recorder (DVR), a digital video disc (DVD) player, an MP3 player, a game system, media player software, a computing device executing media player software, and any other media player or computing device.

The output device 104 may include an output device that makes media content perceivable to a user. In one embodiment, an output device 104 may receive a signal from a media player and convert the signal into perceivable media output such as sound, visible images, or video. For example a display screen, video card, or other image or video processing device may serve as an output device 104 for visual media content such as images and/or video. A speaker, amplifier, or other audio equipment may serve as an output device for audio content such as music. In one embodiment, the output device 104 may include a television having a display screen and one or more speakers. In another embodiment, the output device 104 may include a video projector and screen. In another embodiment, the output device 104 may be a monitor connected to a computer. One of skill in the art will recognize other forms of an output device 104 capable of making media content perceivable to a user.

The observation device 106 may include any type of device for actively observing or detecting a presence or identity of an individual. In one embodiment, the observation device 106 may observe an area that includes a perceiving range of content played by the media player 102. In one embodiment, the observation device 106 senses light, sound, dimensions, or other data and provides a data feed based on what is sensed. For example, the observation device 106 may be situated such that it detects light, sound, communications, or any other desired information within a perceiving range. The perceiving range may include a location where content provided by a media player 102 and/or output device 104 may be perceivable to a user. For example the perceiving range may include a location where an individual can see a display screen or hear audio from a speaker. Exemplary observation devices 106 include but are not limited to a still image camera, a video camera, a microphone, and an antenna.

The profile management apparatus 108 may manage one or more profiles. In one embodiment, the profile management apparatus 108 may manage profiles based on information provided by one or more of the media player 102, the output device 104, and the observation device 106. For example, the profile management apparatus 108 may receive data from one or more of the other components 102, 104, 106 and manage profiles based on the received data.

In one embodiment, the profile management apparatus 108 may receive a data feed from an observation device 106. The profile management apparatus 108 may analyze the data feed to identify one or more individuals. In one embodiment, the profile management apparatus 108 may automatically switch between profiles based on the one or more identified individuals. The profile management apparatus 108 may control available media content based on the selected profile. Controlling available media content may include, but is not limited to, updating a profile to reflect consumed content, customizing available media based on the profile, and restricting access to certain media based on the profile. Further discussion of the features and operations of the profile management apparatus 108 will be provided in relation to FIG. 2.

In one embodiment, the media system 100 may include a plurality of media players 102 and a media hub (not shown). For example, media hub may receive inputs from the media players. The media hub may provide an output to a display device, such as a display screen or speaker. In one embodiment, the media system 100 may include a plurality of profile management apparatus 108 within one or more different devices. For example, each of a plurality of media players may include a profile management apparatus 108.

In one embodiment, one or more of the media player 102, the output device 104, the observation device 106, and the profile management apparatus 108 may be embodied in the same device. For example, a cable TV set-top box, a digital video recorder (DVR), etc. may function as both a media player 102 and a profile management apparatus 108. In one embodiment, a television may include a built in DVR that functions as a media player 102, a display screen and speakers that function as output devices 104, a front facing video camera that functions as an observation device 106, and a profile management apparatus 108. In one embodiment, a media hub may include a profile management apparatus 108. In another embodiment, one or more components 102-108 of the system may be located at remote locations and communicate over a communications network. One of skill in the art will recognize other embodiments where two or more of the media player 102, the output device 104, the observation device 106, and the profile management apparatus 108 may be embodied in the same device without departing from the scope of the present disclosure.

Figure 1B:
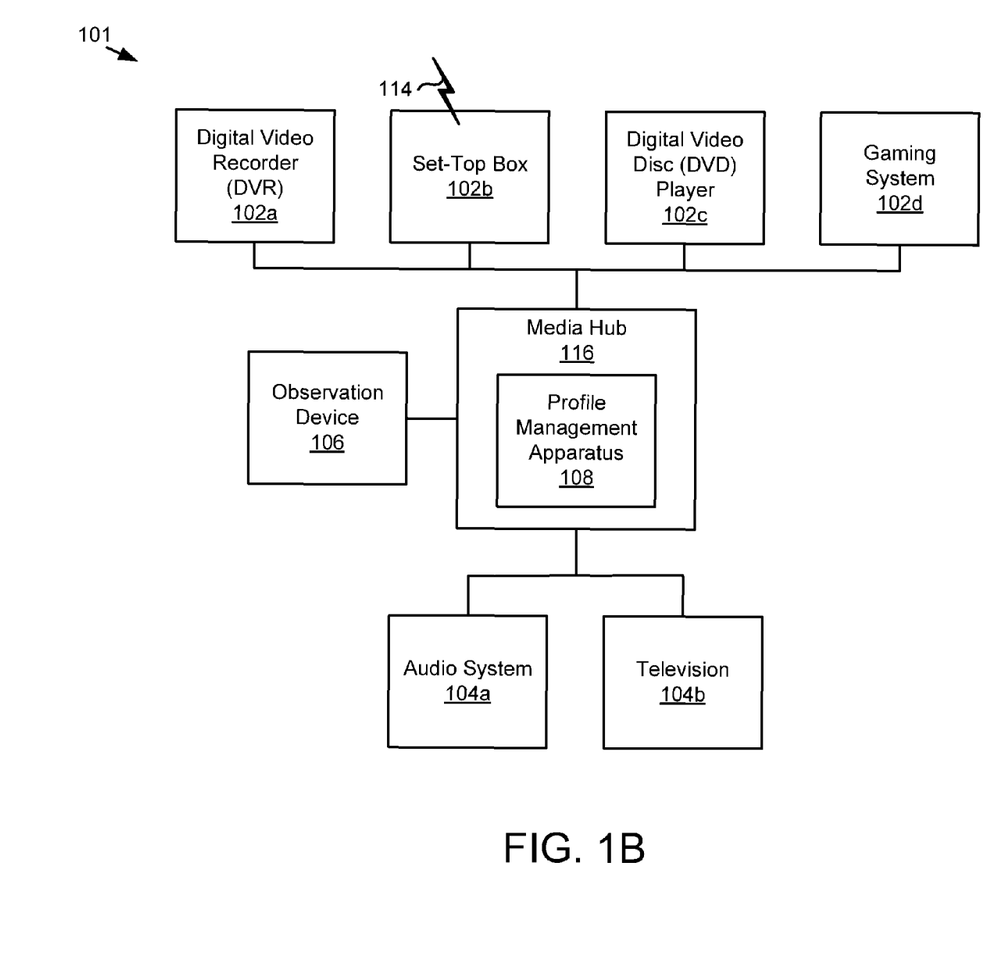

FIG. 1B illustrates another embodiment of a media system 101 for providing media content. The media system 101 may include a plurality of media players 102 such as one or more of a digital video recorder (DVR) 102a, a set-top box 102b with a connection 114 to a network, a digital video disc (DVD) player 102c, and a gaming system 102d. Other media players 102 may be included as well.

In the depicted embodiment, the media players 102a-102d are connected to one or more inputs of a media hub 116. In one embodiment, the media hub 116 may operate as a switch or input selector of the multiple media players 102a-102b. For example, the media hub 116 may select an input signal from one of the media players 102a-102d and provide it as output to an output device 104a, 104b. In one embodiment, the media hub 116 may itself be a media player. For example, the media player 116 may be a DVR or DVD player or any other type of media player in some embodiments. The media hub 116 is shown connected to output devices that include, in one embodiment, an audio system 104a and a television 104b.

In one embodiment, the media hub 116 includes a profile management apparatus 108 and receives input from an observation device 106. In another embodiment, the media hub may operate to control media output from the one or more media players 102a-102b based on the function(s) of the profile management apparatus 108. In other embodiments, the profile management apparatus 108 may alternately or additionally be located in one of the media players 102a-102d or other device. In one embodiment, one or more of the media players 102a-102d, media hub 116, observation device 106, and/or output devices 104a-104 may include a profile management apparatus 108 which allows the separate devices to communicate profile and/or content information to each other.

Figure 2:
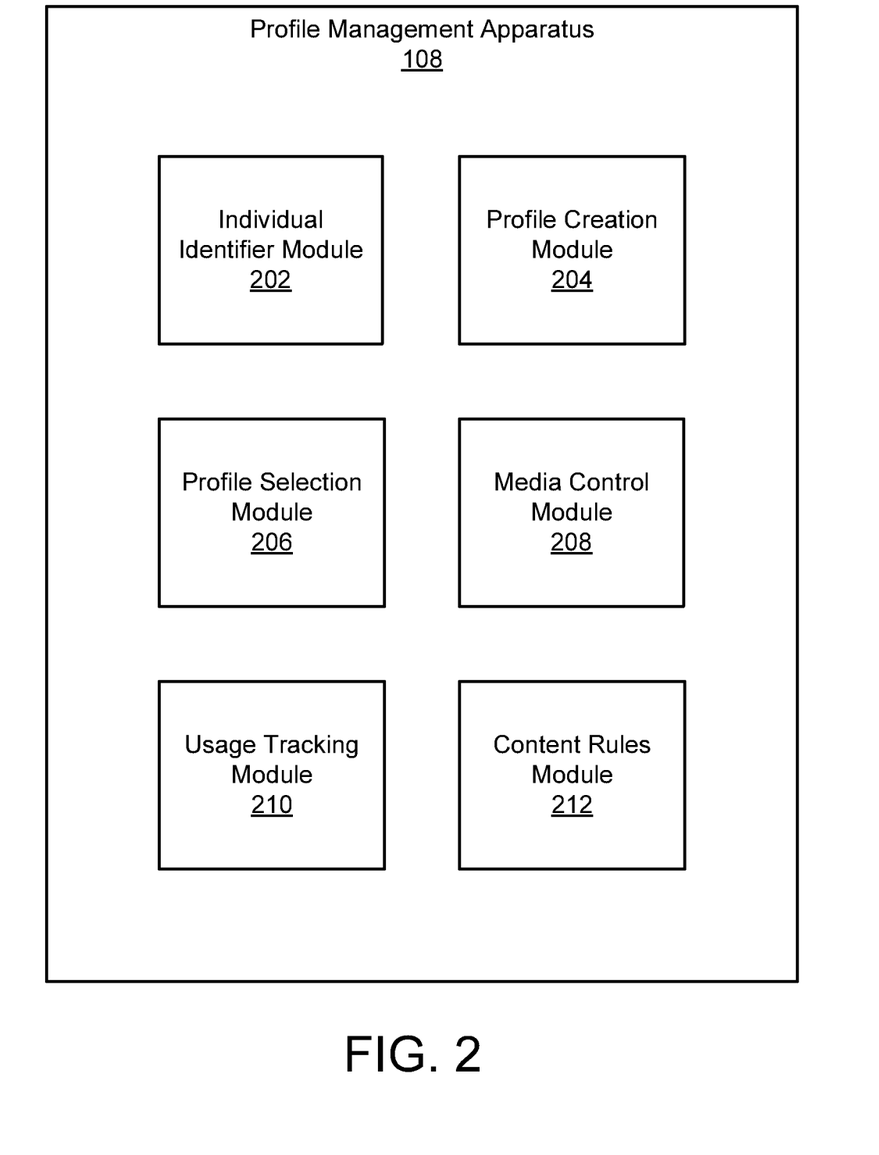
FIG. 2 is a schematic block diagram illustrating one embodiment of a profile management apparatus in accordance with the present invention.

FIG. 2 is a schematic block diagram of one embodiment of a profile management apparatus 108. The profile management apparatus 108 may include an individual identifier module 202, a profile creation module 204, a profile selection module 206, a media control module 208, a usage tracking module 210, and a content rules module 212, which are described below. In some embodiments, only one or a combination of two or more of the modules 202-212 may be included in a profile management apparatus 108. Additionally, all or a portion of the various modules 202-212 may be located in different devices or apparatuses. In one embodiment, one or more modules 202-212 may be located at remote locations and communicate over a communications network.

A profile management apparatus 108 may include an individual identifier module 202. In one embodiment, the individual identifier module 202 may identify one or more individuals as currently within a perceiving range of an output device 104 receiving input from a media player 102. The perceiving range includes an area where content played by the media player is perceivable to the one or more individuals. The media player 102 is for playing media content in an audio and/or visual format. In one embodiment, the individual identifier module 202 may identify one or more individuals based on a data feed from an observation device 106. For example, a video feed from a video camera may be analyzed by the individual identifier module 202 to identify any individuals that are visible in the video feed.

In one embodiment, the individual identifier module 202 may automatically identify one or more individuals. For example, the individual identifier module 202 may automatically identify an individual without the individual providing input into profile management apparatus 108. In another example, the individual may be automatically identified when the individual identifies a perceiving range. In one embodiment, the individual identifier module 202 may identify each individual that is in the perceiving range. In another embodiment, the individual identifier module 202 may identify only one individual in the perceiving range. Automatically identifying an individual may allow individuals to have customized profiles and/or media availability without requiring the individual to enter a password, username, or other login information.

In one embodiment, the individual identifier module 202 may operate similarly to a surveillance device. For example, the individual identifier module 202 may be constantly analyzing a data feed to determine the presence of one or more individuals. In one embodiment, the individual identifier module 202 may be embodied in a surveillance system. For example, the IBM® Smart Surveillance System (IBM S3) has the capability to analyze a live video feed to identify individuals without any user input into the system. In one embodiment, one or more portions of the IBM S3 may be used as an individual identifier module 202 to automatically identify individuals in a video feed.

Figure 3:
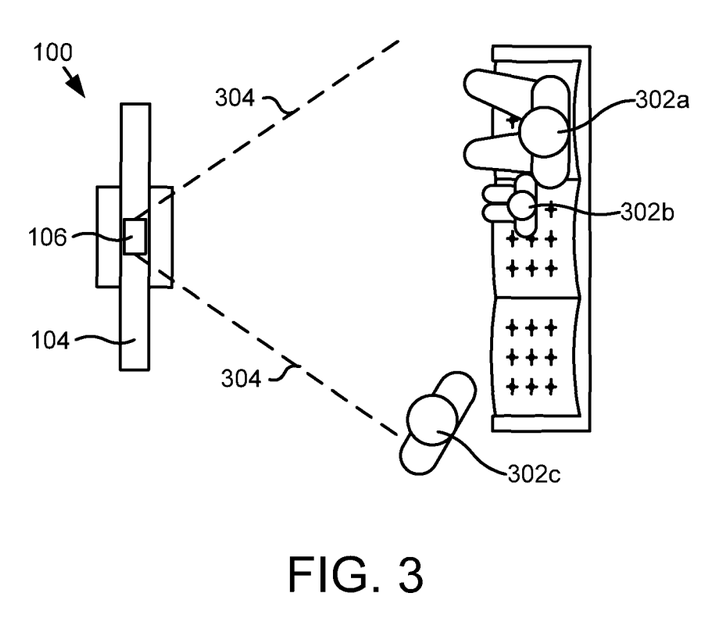
FIG. 3 is a plan view illustrating individuals within a perceiving range of a media system in accordance with the present invention.

FIG. 3 is a plan view illustrating a media system 100, 101 within a consumer living room. The media system 100, 101 is shown with an observation device 106 and a display screen that functions as an output device 104. Individuals 302a, 302b, 302c are depicted as watching the display screen. The individuals 302a, 302b, 302c are shown within a perceiving range 304 and the observation device 106 is observing the individuals 302a, 302b, 302c within the perceiving range 304.

According to one embodiment, the individual identifier module 202 (not shown in FIG. 3) may identify each of the users 302a, 302b, 302c that are within the perceiving range 304 based on input from the observation device 106. If one of the individuals, such as individual 302c, were to leave the perceiving range 304, the individual identifier module 202 may update who is identified to reflect that only individuals 302a and 302b are within the perceiving range 304. Alternatively, if an additional individual were to enter the perceiving range 304 the individual identifier module 202 may update who is identified to reflect that the additional individual is within the perceiving range 304.

In one embodiment, identifying an individual includes determining one or more characteristics of an individual. Characteristics of an individual that can be determined may depend on the type of observation device 106 being used. In one embodiment, an observation device 106 may include a video camera. Using a video feed from a video camera the individual identifier module 202 may be able to determine one or more of a facial characteristic, a physical characteristic, a behavior characteristic, etc. that may uniquely identify an individual. Facial characteristics may be used, for example, for facial recognition. Physical characteristics such as height, build, hair color, or other physical characteristics may be used to identify an individual. Behavior characteristics such as mood, movement, or other characteristics may be used to identify an individual based on behaviors. One of skill in the art will recognize other visual characteristics of an individual that may be observed by the observation device 106 to identify the individual.

In one embodiment, an observation device 106 may include a microphone. Using an audio fed form a microphone the individual identifier module 202 may be able to determine one or more vocal characteristics of an individual. The vocal or voice characteristics of an individual may then be used to identify the individual. In one embodiment, an observation device 106 may include a still camera. Data from the still camera may be used by the individual identifier module 202 to determine facial characteristics and/or physical characteristics of an individual.

In another embodiment, an observation device 106 may include a dimension sensor which can determine distances between objects and/or individuals in a room. For example, one or more cameras may operate as dimensions sensors to determine distances, sizes of objects or features, or other dimensions. Using a feed from a dimension sensor the individual identifier module 202 may be able to determine one or more facial or physical dimensions of an individual which may be used to identify the individual.

In another embodiment, the individual identifier module 202 may maintain an individual log. In one embodiment, each individual identified by the individual identifier module 202 may be logged in the individual log. In one embodiment, an identifying characteristic is stored in association with each individual in the log. In another embodiment, if an individual has been identified before the individual identifier module 202 may determine an entry in the log that corresponds to the individual. For example, the individual identifier module 202 may match a determined characteristic with a characteristic stored in the log. In yet another embodiment, if an individual is identified who has not been identified before, a new entry in the log may be created.

Figure 4:
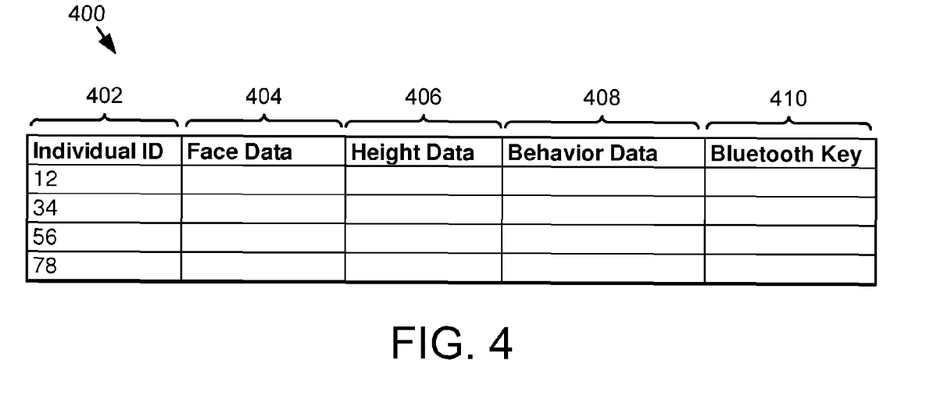
FIG. 4 illustrates an individual log having a table format in accordance with the present invention.

FIG. 4 illustrates one embodiment of an individual log 400. In the depicted embodiment the individual log 400 includes has a table format with a plurality of rows and columns. In the depicted embodiment, each row corresponds to a different identified individual while each column corresponds to information that may be associated with identified individuals. The individual log 400 may include one or more of an individual ID column 402, a face data column 404, a height data column 406, a behavior data column 408, and a Bluetooth key column 410. One of skill in the art will recognize other columns and related information to be included in the individual log 400. Many of the entries within the individual log 400 are shown empty for clarity and simplicity in explanation. One of skill in the art will understand that the individual log 400 may take a variety of formats and need not be embodied as a table. For example, data that corresponds to each row of the table may be stored in separate files. Any other log format may be used including, but not limited to, text, database, or any other storage format.

The individual ID column 402 may include individual ID values corresponding to each identified individual. In one embodiment, the individual ID values may be automatically generated by the individual identifier module 202 each time a new individual is identified. The individual ID values '12', '34', '56', and '78' are exemplary only. Other embodiments may include individual ID values of any type or configuration. In one embodiment, each individual ID value may be unique from other individual IDs in the individual log 400. In one embodiment, the individual ID values may be communicated between devices and/or modules to indicate which individuals are receiving media content.

The face data column 404 may include data that corresponds to the face of an individual. For example, data for facial recognition may be stored in the face data column 404 such that when the individual is identified the individual may be matched up with the already existing entry in the individual log 400. The face data of the first row may correspond to the same individual as the value in the first row of the individual ID column 402. In one embodiment, data in the face data column 404 may be observed by a video or still camera. In one embodiment, a dimension sensor may be used to observe face data.

The height data column 406 may include information regarding the physical height of an individual. For example, an approximate height for corresponding individuals may be stored in the height data column 406. In one embodiment, a height of an individual may be observed by a video camera, a still camera, or a dimension sensor. The physical height of an individual is only one embodiment of a physical build attribute of an individual which may be observed and/or identified by the individual identifier module 202.

The behavior data column 408 may include information regarding behavior of an individual. The behavior data column 408 may include information about an individual's behavior based on observing an individual's mood, movements, or other behavior. For example, by sensing facial expressions, body language, or other attributes of an individual and/or how they change over time the individual identifier module 202 may be able to uniquely identify an individual. This may be useful in situations where individuals look very similar for example, when there are twins in a household. The individual identifier module 202 may be able to nevertheless uniquely identify twins based on behavior attributes that are unique to each.

The Bluetooth key column 410 may include a Bluetooth key corresponding to an individual. For example, the Bluetooth key may include a Bluetooth key of an electronic device such as a phone or other portable electronic device. In one embodiment, a Bluetooth key may be observable by an antenna such as Bluetooth antenna. In one embodiment, an individual identifier module 202 may sense each time a specific device comes within range of a profile management apparatus 108 or observation device 106 and identify that a specific individual is within a perceiving range. Other embodiments may include radio frequency identification (RFID) values or other wireless communication values for identifying an individual.

Columns 404-410 include data that may be used to identify an individual. In one embodiment, upon first identifying a new individual, one or more columns 404 may be populated with relevant information. For example, if the individual identifier module 202 determines a characteristic that does not mach an entry in the individual log 400 the individual identifier module 202 may create a new entry having a unique individual ID value and populate one of the columns 404-410 with the characteristics(s). Later on, if a characteristic matching this entry is determined, the individual identifier module 202 may identify an individual as the matching entry.

The data stored by the individual log 400 is exemplary only. Fewer or additional types of data may be included in some embodiments. Exemplary additional types of data that may be stored and/or used for identification include voice, age, and other data. In one embodiment, the individual log 400 may store an age of an individual. In one embodiment, the age may be calculated based on one or more characteristics determined by the individual identifier module 202. For example, the individual identifier module may combine facial characteristics with physical height and/or behavior to create an approximate age for the individual. In one embodiment, an individual or an administrator may be able to enter an age for the individual.

Returning to FIG. 2, a profile management apparatus 108 may include a profile creation module 204. In one embodiment, the profile creation module 204 may create a profile in response to determining that a profile associated with one or more individuals does not exist. For example, if a new individual is identified by the individual identifier module 202 and a profile does not yet exist for that individual, the profile creation module 204 may create a profile to be associated with that individual. For example, if the individual identifier module 202 determines a characteristic of an individual currently within a perceiving range, and there is no match for the determined characteristic in an individual log 400 the profile creation module 204 may create a new entry. As another example, if a new combination of individuals is identified within the perceiving range a new profile may be created that corresponds to the group of individuals.

In one embodiment, the profile creation module 204 may create a profile without user input. For example, no input from the individual may be required for creating the profile. User input, in one embodiment, may include an action intentionally taken by an individual to identify the individual to the system 100, 101 by entry of information at a user interface to the system 100, 101. In one embodiment, user input is given to mean the entry of text, symbols, or characters using an interface. For example, user input may include a physical keyboard, keypad or button, an on screen keyboard, keypad or button, or a gesture recognition interface. In one embodiment, the term user input as used herein may include entering a user name, password, and/or any other string of characters or symbols. In another embodiment, the term user input does not include physical entry into a perceiving area. In another embodiment, the term user input is not given to mean actions that generally individuals would take when consuming a particular type of media content. For example, when watching television or a movie on a display screen it may be necessary to come within a certain perceiving range and/or face the display screen. In one embodiment, such actions do not constitute user input.

In one embodiment, a profile may be used to store data for a specific individual or a specific set of two or more individuals. In one embodiment, the profile may include media usage information. The media usage information may include data regarding how media is used in relation to the profile. For example, the media usage information may include information about the type of content that is accessed with the profile or while the profile is selected. Exemplary media usage information may include the name of the content, the content genre, the content rating, a name of an actor or producer, or any other information. The name of the content may include the name of a TV show, movie, sporting event, or any other name. The content genre may include a label such as sci-fi, sports, cooking, music, fashion, or any other genre. The rating may include TV, movie, gaming, or any other rating.

In one embodiment, the profile may include content restrictions rules. The content restriction rules may include rules that restrict the use of content in relation to a profile. For example, the content restriction rules may limit the rating of content that may be accessed, the time periods during which content may be accessed, and/or other restriction rules. In one embodiment, the content restriction rules may create restrictions on when, how, and by whom certain types of content may be accessed and/or consumed.

Figure 5:
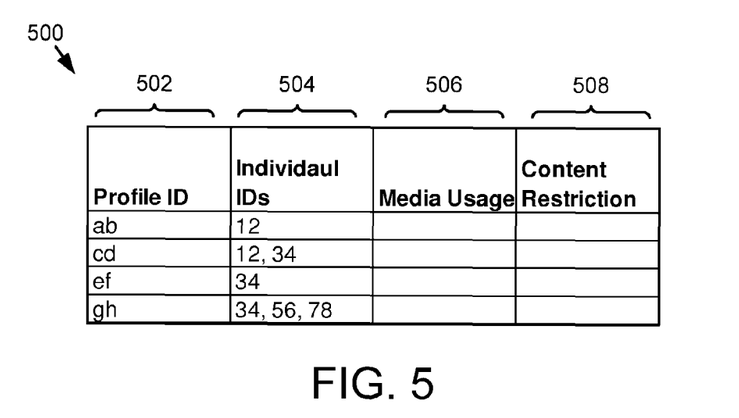
FIG. 5 illustrates a profile log having a table format in accordance with the present invention.

FIG. 5 illustrates one embodiment of a profile log 500 that stores a plurality of profiles and illustrates exemplary information stored in the profiles. In the depicted embodiment the profile log 500 includes a table format and has a plurality of rows and columns. In the depicted embodiment, each row corresponds to a specific profile while each column corresponds to information associated with each profile. In the depicted embodiment, the profile table 500 includes a profile ID column 502, an individual IDs column 504, a media usage column 506, and a content restriction column 508. One of skill in the art will understand that profiles may be stored in a variety of formats and need not be embodied in a table. For example, profiles may be stored in separate files, within a database, or any other data structure.

The profile ID column 502 may include profile ID values corresponding to each profile. In one embodiment, the profile ID values may be used to uniquely identify each profile. The individual ID values '12', '34', '56', and '78' are exemplary only. Other embodiments may include individual ID values of any type or configuration. In one embodiment, the profile ID values may be automatically generated by the profile creation module 204 when a new profile is created. In one embodiment, the profile ID values may be communicated between devices and/or modules to indicate which profile is selected and/or being used by the profile management apparatus 108.

The individual IDs column 504 may include individual ID values of one or more individuals that are associated with the profile. In one embodiment, each profile may correspond to a single individual (individual profile). In one embodiment, a profile may correspond to two or more individuals (group profile). For example, profile ID 'ab' is associated with individual '12' while profile 'gh' is associated with individuals '34', '56', and '78'. According to one embodiment, profile ID 'cd' corresponds to individuals '12' and '34'.

According to one embodiment, a profile may correspond to each unique group of individuals that is identified at a single time or during a programming event. For example, profiles 'ab' and 'ef' includes single individuals and may be referred to as individual profiles. The existence of these individual profiles may indicate that individual '12' sometimes consumes content alone and individual '34' also sometimes consumes content alone. On the other hand profiles 'cd' and 'gh' each include a plurality of individual ID values. For example, the existence of the profile 'cd' may indicate that sometimes individual '12' and individual '34' sometimes watch TV or consume content together. The existence of profile 'gh' may indicate that sometimes individuals '34', '56', and '78' may watch TV or consume content together.

Note that in the embodiment of FIG. 5 profile 'cd' includes individuals '12' and '34' who each have a corresponding individual profile, 'ab' and 'ef', respectively. Thus, individuals '12' and '34' are not only members of individual profiles but also group profile(s). Note also that in FIG. 5 profile 'gh' includes individuals '56' and '78' which do not have corresponding individual profiles. This may indicate that individuals '56' and '78' only watch TV or consume content with the group of individuals '34', '56', and '78'. For example, individuals '56' and '78' may not be household members but may simply be friends that sometimes visit and watch TV or consume content with individual '34'.

The media usage column 506 may include information about media usage associated with the profile. For example, the media usage column 506 may be updated with information about the media content accessed or observed in association with a profile. For example, if the individual '12' associated with the profile 'ab' watches a show, this may be reflected in the data stored in the media usage column 506. The media usage information may be periodically updated based on the actual content selected or consumed by the corresponding one more individuals.

The content restriction column 508 may include information about content that may be restricted with respect to a specific profile. For example, the profile 'ef' may be associated with a child who is not allowed to consume content above a certain rating. Data stored within the 'ef' profile may reflect the content rating and limit what can be accessed while using the profile. As an example, individual '12' may be a parent, individual '34' may be a child, and individuals '56' and '78' may be friends of individual '34'. The parent individual '12' may have no restrictions on the parent's usage of media. However, the parent may desire that the child individual '34' and the friends '56' and '78' not watch content above a specific rating. Thus, profile 'ab' may have no content restrictions while profiles 'ef' and 'gh' may have content restrictions. In one embodiment, the profile 'cd' may have a unique set of restrictions from profiles 'ab', 'ef', and 'gh'. This may reflect that the parent individual '12' may be more comfortable with the child individual '34' watching higher rated content when the parent individual '12' is present.

Returning to FIG. 2, a profile management apparatus 108 may include a profile selection module 206. The profile selection module 206 may select a profile based on one or more individuals identified by the individual identifier module 202. According to one embodiment, the profile selection module 206 may receive information regarding individuals that are currently identified. For example, the individual identifier module 202 may provide one or more individual ID values (such as those in column 402 of FIG. 4) to the profile selection module 206. Based on these individual ID values, the profile selection module may then select a profile. For example, the profile selection module 206 may select a profile in a profile log 500 as a current profile. For example, if the individual identifier module 202 identifies individuals '12' and '34' as within a perceiving range, the profile selection module 206 may select the profile having the profile ID 'cd'.

In one embodiment, the profile selection module 206 may select a single profile at a time. For example, when individuals '12' and '34' have been identified profile 'cd' may be selected. Profiles 'ab' and 'ef' may not be selected and may not be affected by any actions taken and may not have any effect on available media content. In one embodiment, allowing for one profile to be selected at a time may result in more targeted and useful functions of the profile management apparatus 108. For example, if an individual tends to watch sports or sci-fi content when alone and only watches nature programs and or romantic movies with a spouse, the group watching habits may not affect the individual watching habits. Additionally, if a parent wants to be able to make decisions about what a child watches when the parent is in the room, even if a content rating is higher is lower when the child is not with the parent, the separate profiles may allow for the group watching habits to not affect the parent's or child's individual profiles.

In one embodiment, which of a plurality of profiles is selected may be based on one or more current conditions within a group. For example, if a group of four people are present the profile selection module 206 may default to selecting a group profile. In one embodiment, the profile selection module may select one of the individual profiles of the individuals of the group if one or more conditions are met. For example, an individual profile may be selected based on which individual is holding a remote, which individual is closest to an observation device 106, or any other condition.

In one embodiment, the profile selection module 206 may select the profile of an individual who is holding a remote. In one embodiment, the individual identifier module 202 may be able to determine, based on a data feed from an observation device, which individual is holding a remote. The individual identifier module 202 may notify the profile selection module that a particular individual is holding a remote. The profile selection module 206 may then select the profile of that particular individual. In one embodiment, the profile selection module 206 may select the profile of an individual who is closest, who is oldest, or any other attribute. This may allow an individual to access personal preferences within an individual profile even when a group is present.

In another embodiment, more than one profile may be selected at a time. For example, when individuals '12' and '34' have been identified profiles 'ab', 'cd', and 'ef' may all be selected. This may result in any actions or watching habits of individuals taken together as a group may affect individual profiles and watching habits of the group may affect a group profile. This may allow for the sharing of interests and may allow a profile management apparatus 108 to come up with suggestions that meet a group interest as well as the interests of individuals of the group.

According to one embodiment, which profile(s) is/are selected may determine on which profiles the modules 202-212 perform operations or functions. For example, modules 208-212 may perform their operations only on profiles that are currently selected. In one embodiment, if a single profile is selected at a single time actions taken with a group profile may not affect an individual profile and vice versa. These functions will be explained in relation to each respective module.

The profile management apparatus 108 may include a media control module 208. The media control module 208 may control media that is available for selection. The media control module 208 may control available media based on a currently selected profile. The media control module 208 may control available media based on one or more of media usage information of a profile and/or content restriction rules of a profile identified by the profile selection module 206.

In one embodiment, the media control module 208 may control what content is accessible. For example, if a selected profile includes a content restriction rule in the content restriction column 508 of a profile log 500 the media control module may limit access to certain content. For example, the content restriction column may include a rule defining that the profile can only be used to access television content having a rating less than TV-14. The media control module 208 may then block all access to content that has a rating of TV-14 or higher. In one embodiment, the blocked content may be listed but may not be accessible. For example, a media guide may list content that has a TV-14 or higher rating but may not allow it to be selected. In one embodiment, the blocked content may not even be listed. For example, when viewing a media guide or other list of available content, the content having rating of TV-14 or higher may not even be visible. In this manner, an individual or group of individuals may be limited to only seeing content listed that they are able to view. As will be understood by one of skill in the art, any rating system may be used and may include a game rating system, a movie rating system, a TV rating system, or any other content rating system which may be used.

In one embodiment, the media control module 208 may control how content is listed. How content is listed or displayed may depend on one or more of media usage information and content restriction information. In one embodiment, content is prioritized based on information in profile. For example, if the media usage information of an account indicates that a profile has only been used to watch sci-fi and sports content, sci-fi and sports content may be listed higher in a media guide or may be highlighted or emphasized. This may allow an individual using a particular profile to more easily locate content in line with what the individual generally wants to watch. In one embodiment, content having a lower priority based on media usage data may be listed lower in a media guide and/or may be smaller and or de-emphasized in relation to higher priority content.

The media control module 208, for example, may manage content recordings. In one embodiment, the media control module 208 may initiate content recordings based on data within one or more profiles. For example, the media control module 208 may initiate a digital video recorder (DVR) to record television programming that is in line with the media usage data and content restriction rules of one or more of the profiles. In another embodiment, content recording may be initiated with respect to a profile whether or not the profile is currently selected.

In another example, the media control module 208 may notify of content recordings based on a profile. In one embodiment, the media control module 208 may provide notifications of available recorded content based on a currently selected profile. For example, if a currently selected profile includes media usage and/or content restrictions in line with the recorded content, a notification may be provided when the profile is selected. In another embodiment, recorded content may be provided in a list or media guide in a prioritized format. For example, if a program was recorded for a child, the recording may not be suggested, listed, or even available when a parent's profile is selected.

In another example, the media control module 208 may provide suggestions for media content based on a selected profile. In one embodiment, the suggestions may be based on the media usage data and/or the content restriction rules. For example, if an individual watches a lot of nature programming suggestions for nature shows that are often watch, new nature shows or programming not previously or recently accessed using a profile may be suggested. In one embodiment, content not in accordance with one or more of the media usage data and content restriction rules of an account may not be suggested. One of skill in the art will recognize other ways that the media control module 208 may control media available for selection on the media player 102 based on media usage information and/or content restriction rules of the selected profile.

A profile management apparatus 108 may optionally include a usage tracking module 210. The usage tracking module 210, in one embodiment, updates media usage information based on media content selected by the one or more identified individuals identified by the individual identifier module 202. The usage tracking module 210, in another embodiment, may update profiles to reflect content that has been selected and/or viewed in relation to a profile. In one embodiment, the usage tracking module 210 may update media usage data to reflect content selected and viewed for a currently selected profile. For example if the one or more identified individuals identified by the individual identifier module 202 watch a TV show, the media usage data of a currently selected profile may be updated to reflect the type, name, and/or other information of the show. In one embodiment, if a plurality of profiles are currently selected each of the plurality of profiles, the usage tracking module 210 may update the profiles to reflect the media usage.

A profile management apparatus 108 may optionally include a content rules module 212. The content rules module 212 may update content restriction rules for one or more profiles. In one embodiment, the content rules module 212 may update the content restriction rules based on media usage information of the profile(s) identified by the profile selection module 206. In another embodiment, the content rules module 212 may analyze media usage data to determine the rating of content accessed in relation to the profile. For example, if the media usage data reflects that the profile is never used to access content above a certain rating, the content rules module 212 may update content restriction rules to limit access to content above that rating.

In one embodiment, the content rules module 212 may update the content restriction rules based on user input or input by an administrator. In another embodiment, an individual may adjust the content restriction rules to reflect a desired content rating. For example, an individual may not wish to be see options or listings for content above a certain rating. In another embodiment, the individual may select an option to configure content restriction rules and change the rules to reflect the desired content rating. In one embodiment, an individual or group of individuals may only update content restriction rules in a profile of which they are a member individual. In one embodiment, an administrator may be able to update content restriction rules for any profile. For example, a parent may be an administrator in the profile management apparatus 108 and may be able to make modifications to any profile in a profile log 500.

In one example, the content rules module 212 may update the content restriction rules based on an age of an individual identified by the individual identifier module 202 and that corresponds to a profile. In one embodiment, the age may be an age entered by the individual or an administrator. In another embodiment, the age may be an age determined by the individual identifier module 202. In another embodiment, an age of a youngest individual that corresponds to a profile may determine a content restriction rule relating to content rating for that profile. In another embodiment, an age of an oldest individual that corresponds to a profile may determine a content restriction rule relating to content rating for that profile. In yet another embodiment, an administrator may be able to override content restrictions and/or profile selections.

Figure 6:
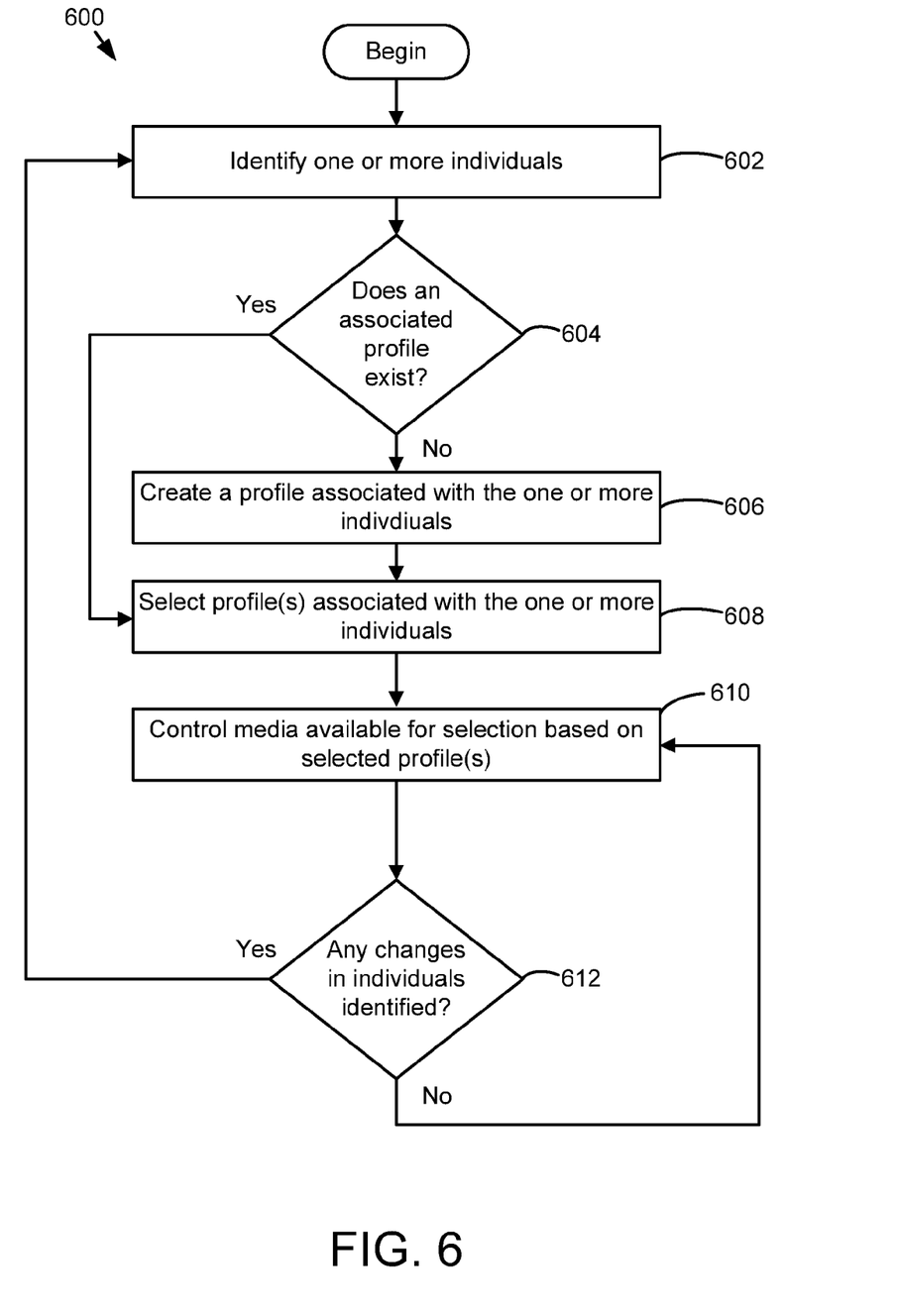
FIG. 6 is a schematic flow chart diagram illustrating one embodiment of a method for managing profiles for media content selection in accordance with the present invention.

FIG. 6 is a schematic flowchart diagram illustrating one embodiment of a method 600 for managing profiles. In one embodiment, the method 600 may be performed by a profile management apparatus 108. In one embodiment, the method 600 may be performed to control available media selection on a media system, such as the media system 100 of FIG. 1.

The method 600, in one embodiment, includes automatically identifying 602 one or more individuals that are currently within a perceiving range of a media player 102. The media player 102 is for playing media content in an audio and/or a visual format. The method 600 includes, in one embodiment, automatically identifying the one or more individuals without user input. The perceived range includes an area where content played by the media player 102 is perceivable to the one or more identified individuals. In another embodiment, the one or more individuals may be identified based on a data feed from an observation device 106. In another embodiment, the individuals may be identified by one or more characteristics that uniquely identify the individual from other individuals in an individual log 400.

The method 600, in one embodiment, includes determining 604 if a profile associated with the identified one or more individuals exists. The profile creation module 204, in one embodiment, determines 604 the existence of a profile. In one embodiment, determining 604 if a profile associated with the identified one more individuals exists includes searching for a determined characteristic in an individual log 400. If the characteristic is not found within the individual log 400, the profile management apparatus 108 may determine 604 that a profile does not exist.

If the method determines 604 that a profile does not exist, the method 600 includes, in one example, creating 606 a profile to be associated with the one or more individuals. The profile may be created 606 by a profile creation module 204. Creating 606 the profile may be performed without user input. If a profile creation module 204 determines 604 that an account associated with the identified one more individuals already exists, the method 600 may skip creating 606 a profile.

The method 600 may include selecting 608 at least one profile that is associated with the one or more individuals. Selecting 608 the profile may be performed by a profile selection module 206. A profile, in one embodiment, includes media usage information and/or content restriction rules for controlling available media selection. In another embodiment, only a single profile may be selected 608 at a single time. In yet another embodiment, two or more profiles may be selected at a single time.

The method 600 includes, in one embodiment, controlling 610 media that is available for selection on the media player 102 based on the selected profile. The controlling 610 of media may be done by a media control module 208. In one embodiment, the media control module 208 controls 610 the media that is available for selection based on media usage information in one or more selected profiles. In another embodiment, the media control module 208 controls 610 the media that is available for selection based on content restriction rules in one or more selected profiles.

The method 600 includes, in one example, determining 612 if there are any changes to the identified individuals. In one embodiment, the individual identifier module 202 repeatedly determines 612 if there are any changes to the identified individuals. For example, if an individual leaves a perceiving area and is no longer identified, the individual identifier module 202 may determine 612 that there is a change in the individuals. The method 600 may then start over with identifying 602 the one or more individuals. If the individual identifier module 202 determines 612 that there haven't been any changes to the identified individuals the method may continue controlling 610 the media that is available for selection based on the selected profile(s).

In one embodiment, the method 600 may execute as long as a media system 100, 101 is in use. In another embodiment, the method 600 controls 610 the media that is available for selection on the media system 100, 101.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an individual identifier module that automatically identifies one or more individuals as currently within a perceiving range of an output device receiving input from a media player, the media player for playing media content in one or more of an audio and a visual format, the one or more individuals automatically identified without user input, the perceiving range comprising an area wherein content played by the media player is perceivable to the one or more individuals, wherein the individual identifier module automatically identifies one or more individuals based on input from an observation device and wherein identifying one or more individuals comprises automatically determining at least an approximate age of each of the one or more individuals that lack a previously created profile based at least in part on actions indicative of age, wherein automatically determining at least an approximate age of each of the one or more individuals is determined without user input and based on information from the observation device;
a profile creation module that automatically creates a new profile in response to determining that a profile associated with the one or more individuals does not exist, the new profile automatically created without user input, wherein the new profile comprises at least an approximate age as determined by the individual identifier module;
a profile selection module that selects at least one profile associated with the one or more individuals, the at least one profile comprising one or more of media usage information and content restriction rules for controlling available media selection, the content restriction rules based at least on age; and
a media control module that controls media that is available for selection on the media player based on the media usage information and the content restriction rules of the at least one profile identified by the profile selection module, wherein the media control module automatically controls access to media based on an approximate age corresponding to the identified at least one profile without user input, wherein said modules comprise one or more of logic hardware and executable code, the executable code stored on one or more non-transitory computer readable storage media.

2. The apparatus of claim 1, wherein the one or more individuals identified by the individual identifier module comprise two or more individuals and wherein the at least one profile identified by the profile selection module comprises a group profile, the group profile comprising one or more of media usage information and content restriction rules for the group of two or more individuals, wherein the media control module controls media that is available for selection based on the group profile without regard to a profile of a single individual of the two or more individuals.

3. The apparatus of claim 1, wherein the at least one profile identified by the profile selection module comprises the media usage information, the apparatus further comprising a usage tracking module that updates the media usage information based on media content selected by the one or more identified individuals.

4. The apparatus of claim 3, wherein a plurality of profiles are stored in a profile log, the plurality of profiles comprising a group profile associated with two or more individuals and an individual profile associated with an individual of the two or more individuals, wherein
in response to the two or more individuals being identified as currently within a perceiving range of a media player, the usage tracking module updates media usage information of the group profile but not media usage information of the individual profile; and
in response to the individual of the two or more individuals being identified as currently alone within a perceiving range of a media player, the usage tracking module updates media usage information of the individual profile but not media usage information of the group profile.

5. The apparatus of claim 1, wherein the observation device comprises one or more of: a video camera; a wireless antenna; a microphone; and a dimension sensor.

6. The apparatus of claim 1, wherein the individual identifier module automatically identifies the one or more individuals based on one or more of: facial recognition; vocal characteristics; behavior; and physical characteristics.

7. The apparatus of claim 1, wherein the at least one profile identified by the profile selection module comprises the content restriction rules, the apparatus further comprising a content rules module that updates the content restriction rules based on one or more of:
input by an administrator; and
an age of an individual of the one more individuals.

8. The apparatus of claim 1, wherein the media control module controls media that is available for selection based on one or more of the media usage information and the content restriction rules by one or more of blocking media; suggesting media; and prioritizing media.

9. The apparatus of claim 1, wherein the identification module automatically determines at least an approximate age of each of the one or more individuals from information from the observation device by additionally determining, for an individual, one or more of: vocal indicators of the individual associated with age; height of the individual; build of the individual; and physical characteristics of an individual indicative of age.

10. The apparatus of claim 1, wherein the identification module further automatically determines a mood of an individual from information from the observation device and the media control module suggests media based on the determined mood of the individual.

11. The apparatus of claim 1, wherein the media control module automatically initiates content recording based on the media usage information and content restriction rules of one or more of the profiles.

12. The apparatus of claim 1, further comprising a content rules module that:
   analyzes the media usage information associated with a profile,
   determines the rating of content accessed in relation to the profile, and
   updates the content restriction rules to limit access to content above a particular content rating in response to determining that content above a particular content rating is never accessed by the profile.

13. A method for controlling available content comprising:
   automatically identifying one or more individuals that are currently within a perceiving range of an output device receiving input from a media player, the media player for playing media content in one or more of an audio and a visual format, the one or more individuals automatically identified without user input, the perceiving range comprising an area wherein content played by the media player is perceivable to the one or more individuals, wherein automatically identifying one or more individuals comprises identifying one or more individuals based on input from an observation device and wherein identifying one or more individuals comprises automatically determining at least an approximate age of each of the one or more individuals that lack a previously created profile based at least in part on actions indicative of age, wherein automatically determining at least an approximate age of each of the one or more individuals is determined without user input and based on information from the observation device;
   automatically creating a new profile, the new profile created in response to determining that a current profile associated with the one or more individuals does not exist, the new profile automatically created without user input, wherein the new profile comprises at least an approximate age;
   selecting at least one profile associated with the one or more individuals, the at least one profile comprising one or more of media usage information and content restriction rules for controlling available media selection, the content restriction rules based at least on age;
   controlling media that is available for selection on the media player, the controlling of the media based on one or more of the media usage information and the content restriction rules of the at least one identified profile; and
   controlling access to media based on an approximate age corresponding to the identified at least one profile without user input.

14. The method of claim 13, wherein the one or more individuals identified by the individual identifier module comprise two or more individuals and wherein the at least one profile identified by the profile selection module comprises a group profile, the group profile comprising one or more of media usage information and content restriction rules for the group of two or more individuals.

15. The method of claim 14, wherein the at least one profile comprises the group profile and wherein the controlling media that is available for selection is based on the group profile without regard to a profile of a single individual of the two or more individuals.

16. The method of claim 13, wherein the at least one profile comprises the media usage information, and wherein the method further comprising updating the media usage information based on media content selected by the one or more identified individuals.

17. The method of claim 16, wherein a plurality of profiles are stored in a profile log, the plurality of profiles comprising a group profile associated with two or more individuals and an individual profile associated with an individual of the two or more individuals, wherein
   in response to the two or more individuals being identified as currently within a perceiving range of a media player, updating the media usage information comprises updating media usage information of the group profile but not media usage information of the individual profile; and
   in response to the individual of the two or more individuals being identified as currently alone within a perceiving range of a media player, updating the media usage information comprises updating media usage information of the individual profile but not media usage information of the group profile.

18. A system comprising:
   a media player;
   an individual identifier module that automatically identifies one or more individuals as currently within a perceiving range of an output device receiving input from a media player, the media player for playing media content in one or more of an audio and a visual format, the one or more individuals automatically identified without user input, the perceiving range comprising an area wherein content played by the media player is perceivable to the one or more individuals, wherein the individual identifier module automatically identifies one or more individuals based on input from an observation device and wherein identifying one or more individuals comprises automatically determining at least an approximate age of each of the one or more individuals that lack a previously created profile based at least in part on actions indicative of age, wherein automatically determining at least an approximate age of each of the one or more individuals is determined without user input and based on information from the observation device;
   a profile creation module that automatically creates a new profile in response to determining that a current profile associated with the one or more individuals does not exist, the new profile automatically created without user input, wherein the new profile comprises at least an approximate age as determined by the individual identifier module;
   a profile selection module that selects at least one profile associated with the one or more individuals, the at least one profile comprising one or more of media usage information and content restriction rules for controlling available media selection, the content restriction rules based at least on age; and
   a media control module that controls media that is available for selection on the media player based on one or more of the media usage information and the content restriction rules of the at least one profile identified by the profile selection module, wherein the media control module automatically controls access to media based on an approximate age corresponding to the identified at least one profile without user input.

19. The system of claim 18, wherein the media player comprises one or more of: a digital video recorder (DVR); a set-top box; a gaming system; and a digital video disc player.

20. The system of claim 18, further comprising a media hub and one or more additional media players, the media hub receiving inputs from the media player and the one or more media players, the media hub providing an input to a display device.

* * * * *